(12) United States Patent
Costin

(10) Patent No.: US 6,332,520 B1
(45) Date of Patent: Dec. 25, 2001

(54) PLANAR RATCHET ONE WAY CLUTCH

(75) Inventor: Daniel P. Costin, Naperville, IL (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/593,895

(22) Filed: Jun. 14, 2000

(51) Int. Cl.⁷ .................................................... F16D 41/12
(52) U.S. Cl. ............................................. 192/46; 192/69.1
(58) Field of Search ........................... 192/46, 45.1, 69.1, 192/108; 188/82.7, 82.74, 82.77

(56) References Cited

U.S. PATENT DOCUMENTS

| | | |
|---|---|---|
| 547,386 | 10/1895 | Stewart . |
| 2,240,359 | 2/1941 | Weigel . |
| 2,779,201 | 1/1957 | Hurley . |
| 5,070,978 | 12/1991 | Pires . |
| 5,449,057 * | 9/1995 | Frank ........................................ 192/46 |
| 5,597,057 | 1/1997 | Ruth et al. . |
| 5,806,643 * | 9/1998 | Fitz ....................................... 192/45.1 |
| 5,829,565 * | 11/1998 | Fergle et al. ............................. 192/46 |
| 5,853,073 | 12/1998 | Costin . |
| 5,871,071 | 2/1999 | Sink . |
| 5,918,715 * | 7/1999 | Ruth et al. ............................... 192/46 |
| 5,947,245 | 9/1999 | Costin et al. . |
| 5,954,174 | 10/1999 | Costin . |
| 6,186,299 * | 2/2001 | Ruth ....................................... 192/46 |

FOREIGN PATENT DOCUMENTS 2116  1/1907 (GB) .

* cited by examiner

*Primary Examiner*—Richard M. Lorence
(74) *Attorney, Agent, or Firm*—Emch, Schaffer, Schaub & Porcello Co., L.P.A.; Greg Dziegielewski

(57) ABSTRACT

The invention is a planar clutch having a plurality of pawls and a related plurality of notches numerically selected so that two more pawls are engaged at substantially the same time, thus sharing and balancing the eccentric forces of engagement between the drive plate and the driven plate. The pawls have a cross-sectional design, wherein each pawl has surfaces for receiving compressive loading forces and is thicker at a middle point between the surfaces for receiving compressing loading forces. A pivot ridge is located at the thickest area of the pawl.

17 Claims, 8 Drawing Sheets

PLANAR RATCHET ONE WAY CLUTCH

TECHNICAL FIELD

This invention relates to clutches, and more particularly to a planar ratchet one way clutch apparatus.

BACKGROUND OF THE INVENTION

Overrunning or one way clutches are commonly known today and there are various types of such clutch assemblies in use. Overrunning clutch assemblies are designed to have many different structures, including ratchet-type clutches and traction/locking clutches, such as a roller ramp clutch or sprag clutch. Traction-type clutches are generally limited in their applicability if high torque delivery is a design requisite. Therefore, ratchet-type clutches are preferred in instances where increased torque capacity is needed for transmissions containing one way clutch assemblies. Such rachet-type clutch assemblies make use of pawls carried by a drive member, which are designed to engage with notches, commonly located in a driven member. The capacity to carry increasing torque amounts and eliminate the potential for clutch backlash variously depends upon the number of pawls engaged with notches at any given point in time and the overall dimensions of the driven and drive members.

A typical ratchet-type clutch assembly is shown in U.S. Pat. No. 5,853,073. The '073 patent discloses a radial ratchet clutch assembly having an inner radial race juxtaposed with an outer radial race. The outer radial race includes a plurality of pockets having pawls positioned in the pockets for engagement with notches located in the inner radial race. The pawls are designed to have a center of mass such that when the clutch rotates, centrifugal force acts upon the center of mass and causes the pawls to move into an engaged position with the notches of the inner radial race. Other embodiments in the '073 patent make use of spring members to tilt or force the pawls toward engagement with the notches.

Radial ratchet clutch assemblies such as that disclosed in the '073 patent can be designed for heavy torque transfer and are commonly very reliable. However, when design applications call for a lightweight clutch assembly or clutch assembly of minimized axial dimensions that remains capable of high torque transfer, radial ratchet one way clutches such as that shown in the '073 patent are commonly unsuitable.

One solution has led to the design of a planar ratchet assembly, such as that shown in U.S. Pat. No. 5,070,978. The '978 patent discloses a planar ratchet one way clutch having a planar drive member and a planar driven member positioned in close proximity to the planar drive member. A series of pockets is incorporated in the driven face and a plurality of cooperating pawls are positioned in the drive face. When the drive member is rotated in a desired direction by a suitable source of power, only one of the plurality of pawls will engage with only one of the plurality of pockets to impart drive forces to the driven member. The pawls of the '978 patent are designed to have a narrow cross-section so as to provide for easy movement from a position of non-engagement to a position of engagement with a low moment of inertia. The pawl members have torsion springs disposed in recesses centrally located in the pawl which act to outwardly displace the pawl for engagement with the pocket of the driven member. However, planar ratchet assemblies such as that disclosed in the '978 patent have encountered problems when heavy torsional loading is applied, such as eccentric deformation of the drive and/or driven plates and a common failure due to the buckling of the pawls.

Another embodiment of a planar ratchet one way clutch assembly is shown in U.S. Pat. No. 5,597,057. The '057 patent again discloses a one way clutch apparatus having a planar driving member with a plurality of recesses and biasing members with pawls of thin cross-section are disposed in the recesses. A driven member having a plurality of engaging notches is juxtaposed with the driving member. The pawls are spring loaded to press engagement of the pawls into the notches of the driven member. Again, problems similar to these discussed earlier with regard to the '978 patent have been encountered with clutches of the type of the '057 patent when heavy torsional loading is applied.

Such planar clutches have small pawls, commonly of a generalized rectangular shape that are long and thin and are commonly designed so that only one pawl is engaged at a time. The use of such long thin pawls allows for the placement of an increased number of pawls and notches in the clutch, thereby reducing the potential for backlash in the clutch. However, because only one pawl is commonly available to carry the entire load, the torque capacity of the prior art planar clutches does not meet desired levels. Loading on a single thin pawl will cause high eccentric loads on the drive plate and driven plate that wear down the clutch. Further, the thinness of the pawl will increase the potential for the pawl to buckle under high static loads.

Thus, it is an object of the invention to provide for a one way planar ratchet clutch capable of carrying and transmitting heavy torque loads.

Yet another objective of the present invention is to provide for a planar ratchet one way clutch, wherein the components are minimized in size without impairing the ability of the clutch to transmit heavy torque loads without incurring eccentric deformation and failure or buckling of the pawls.

Yet another object of the present invention is to provide a planar ratchet one way clutch, wherein at least one of the planar juxtaposed driven members has a flat backing surface capable of utilization as a backing plate for a friction plate of the clutch.

Yet another objective of the present invention is to provide for compact pawls having a cross-section, wherein high torque loading on the pawls will not cause the pawl to buckle.

SUMMARY OF THE INVENTION

The present invention solves these problems and meets the objectives of the invention by providing a planar ratchet clutch assembly having a plurality of pawls and a related plurality of notches numerically selected so that two or more pawls are engaged at substantially the same time. Thus, two or more notches will be engaged by the pawls and share the static load, thereby balancing the eccentric forces of engagement. The pawls of the present invention have a unique shape into which is designed a pivot ridge which serves a dual purpose. The pivot ridge is used to control the pawl motion during transfer from a free wheeling mode to engaged mode. Further, the pawl is designed to be thickest at the pivot ridge, thereby providing for better load carrying capacity and thereby reducing the potential for failure of the pawl during high static loading. The shape of the pawls are further designed such that the compressive surfaces of each pawl that is engaged with a notch are angled from the perpendicular to the line of action of the load on the pawl to provide for positive engagement between each pawl and its respective notch. Thus, if a situation occurs where the pawl is not completely engaged with its respective notch, the compressive load bearing on the pawl will force it rapidly into full engagement with the notch. In one embodiment of the invention, a reduction in the failure rate of the pawl due to buckling can be achieved by maintaining the perpendicular orientation of the compressive load bearing surfaces of the pawl to the line of action of the load.

The pawls incorporated in the present invention are unique in planar ratchet assemblies in that they are shaped to provide a ridge about which the pawls pivot. Prior art planar ratchet assemblies most commonly use an axle as the pivot axis which is attached to the pawl. Thus, an unnecessary structural feature is eliminated in the complex structures of the planar ratchet patents.

DETAILED DESCRIPTION OF THE PREFERRED EMBODIMENT

Figure 1:
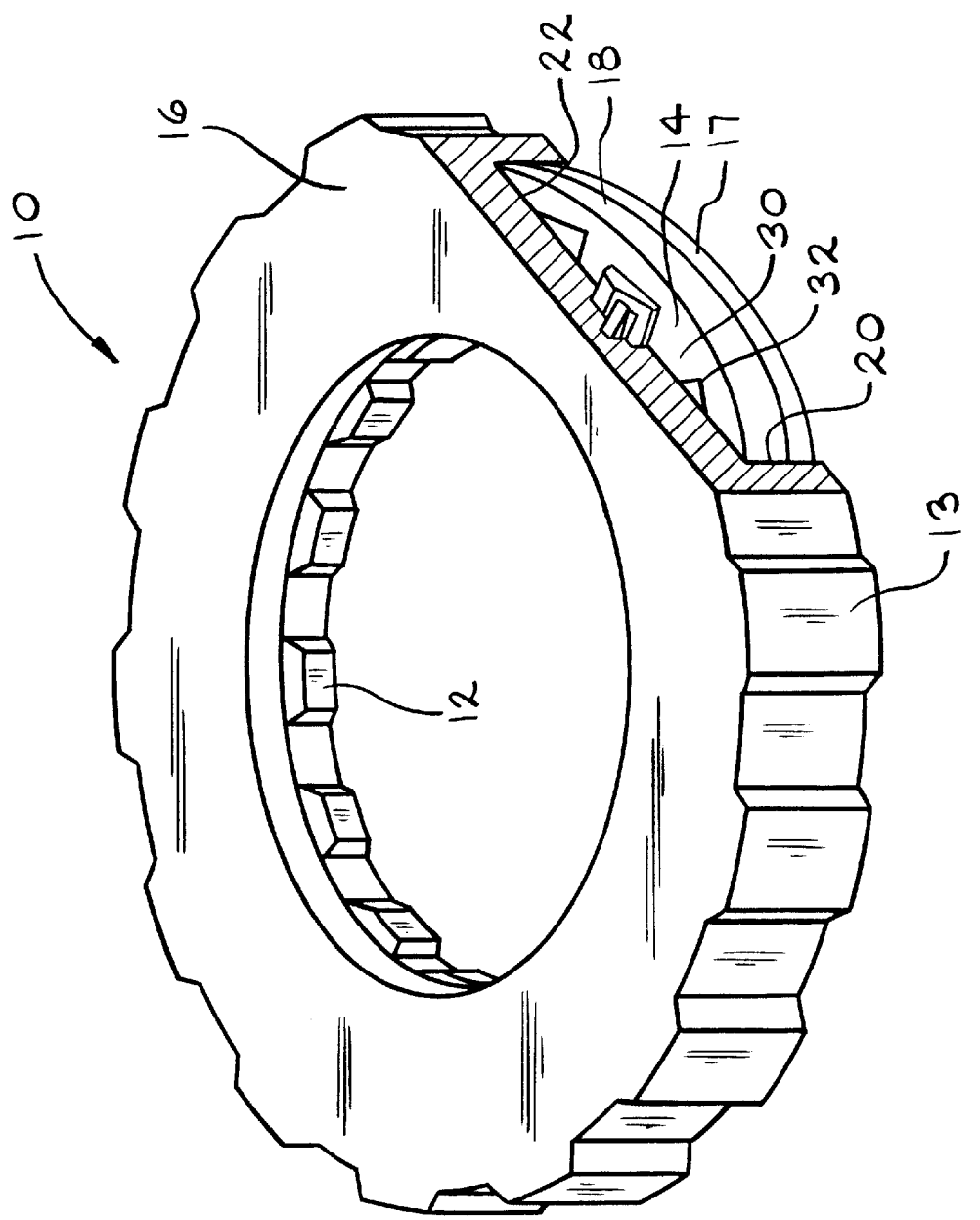
FIG. 1 is a perspective view of the planar clutch assembly of the present invention with a cutaway to show a pawl, spring and notch assembly.

FIG. 1 shows a perspective view of the planar ratchet clutch assembly of the present invention which is generally indicated by the reference numeral 10. This clutch assembly is designed to be in engagement with an input shaft having a longitudinal axis which is adapted to be connected to a source of power (not shown) for rotating the shaft about its longitudinal axis. The power input shaft commonly includes a series of circumferentially spaced splines which are engaged with the inner radial splines 12 of a driven plate or notch plate 14. The input shaft through its engagement with the splines 12 of the notch plate 14 will serve as the drive member for the clutch assembly 10 by providing clockwise and counterclockwise rotation to the driven plate or notch plate 14. The drive plate or pocket plate 16 forms a shell-like structure which radially encloses the notch plate 14 and creates a close tolerance interface between the outer diameter 18 of the notch plate 14 and the adjacent inner diameter 20 of the pocket plate 16. Thus, the close tolerance between the outer diameter 18 and the inner diameter 20 serves to radially support and center the pocket plate 16. A retainer plate 17 is fixed to the notch plate 14 to axially enclose the pocket plate 16 by known means such as welding, riveting, or a screw-on type structure.

Figure 3:
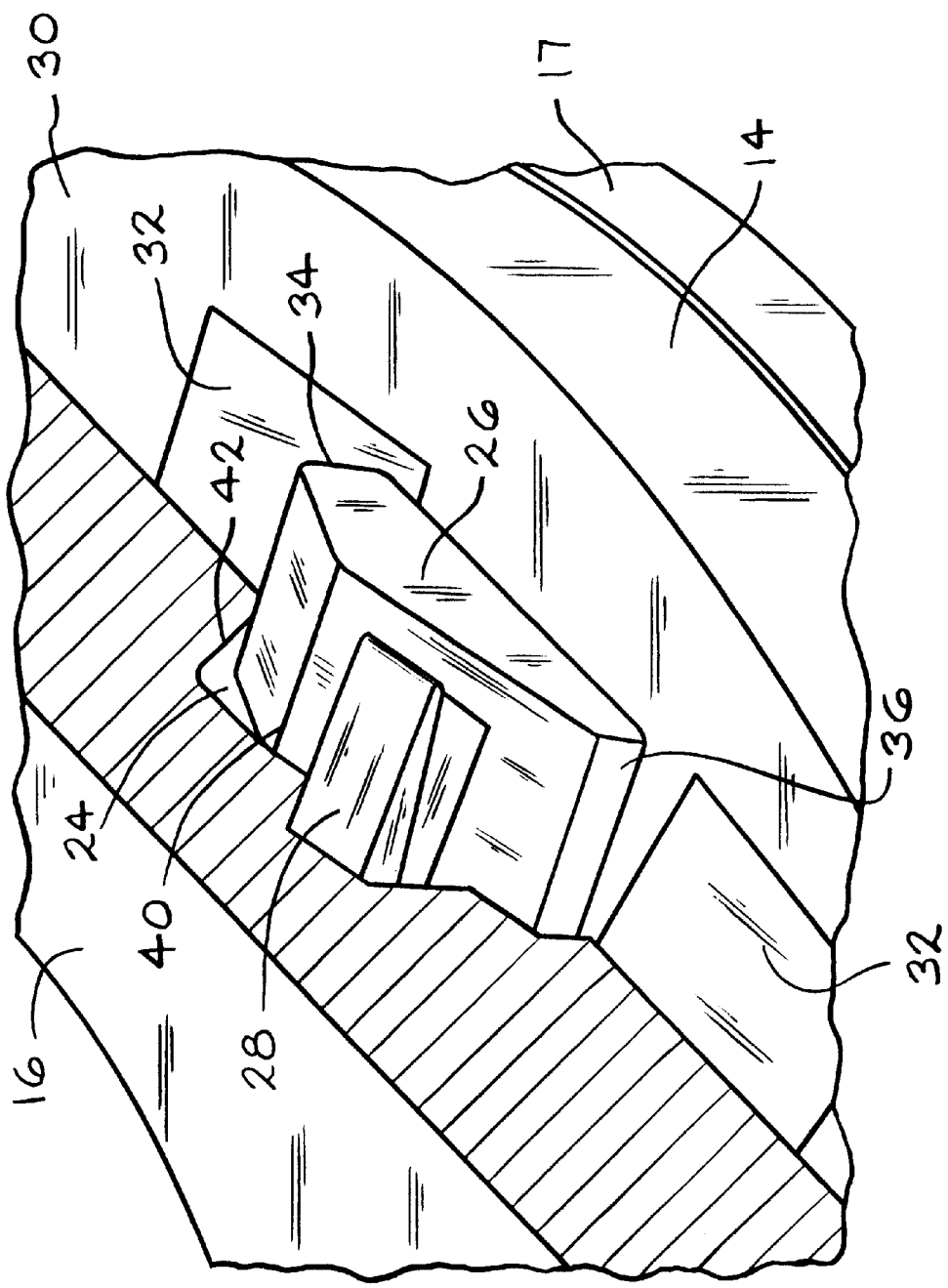
FIG. 3 is a detail view of the cutaway of FIG. 1 of a pocket plate and a notch plate showing the pawl in a disengaged position with the notch plate.
Figure 4:
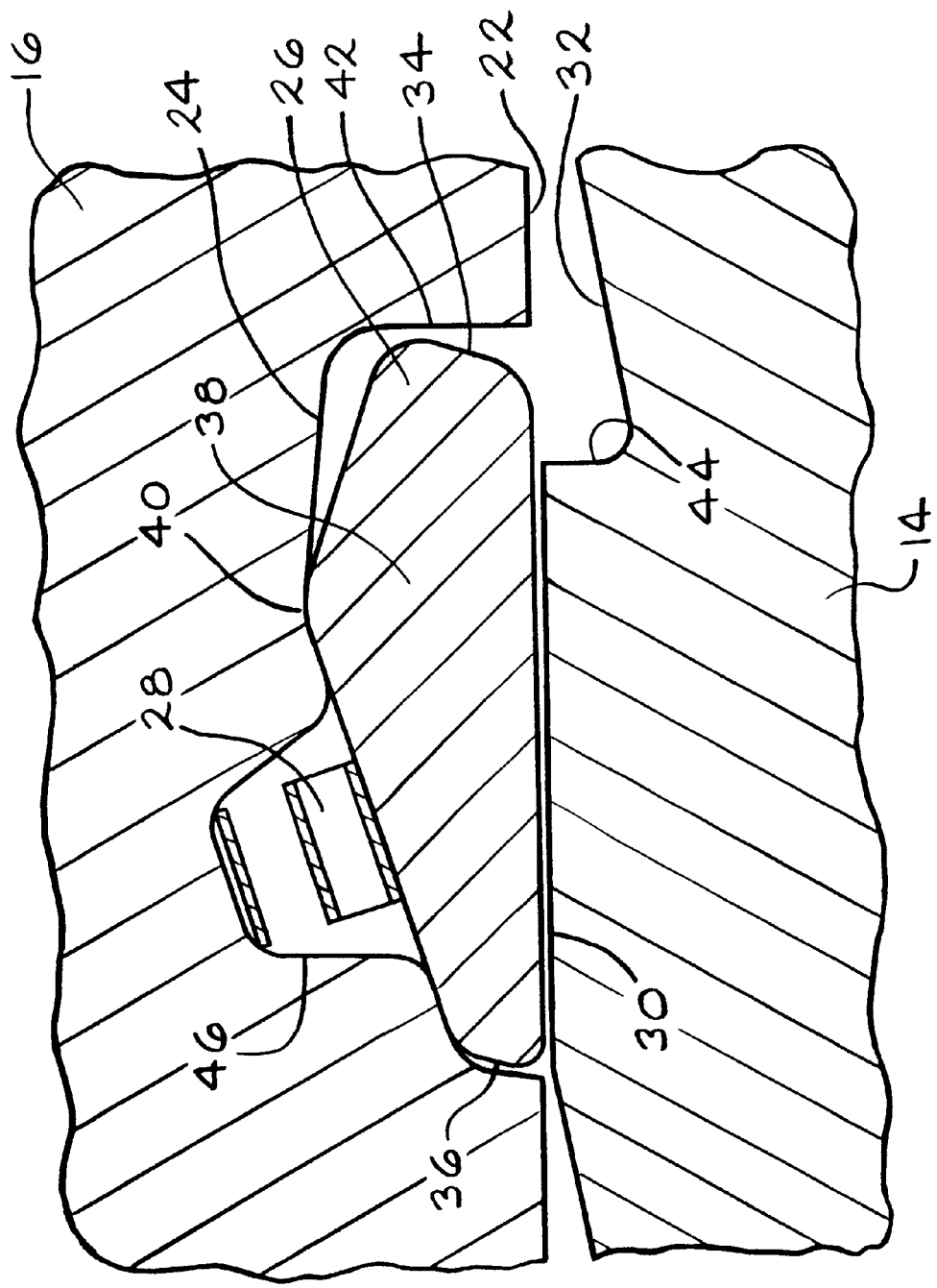
FIG. 4 is a side cutaway detail view of a pocket plate and a notch plate showing the pawl in a disengaged position with the notch plate.
Figure 5:
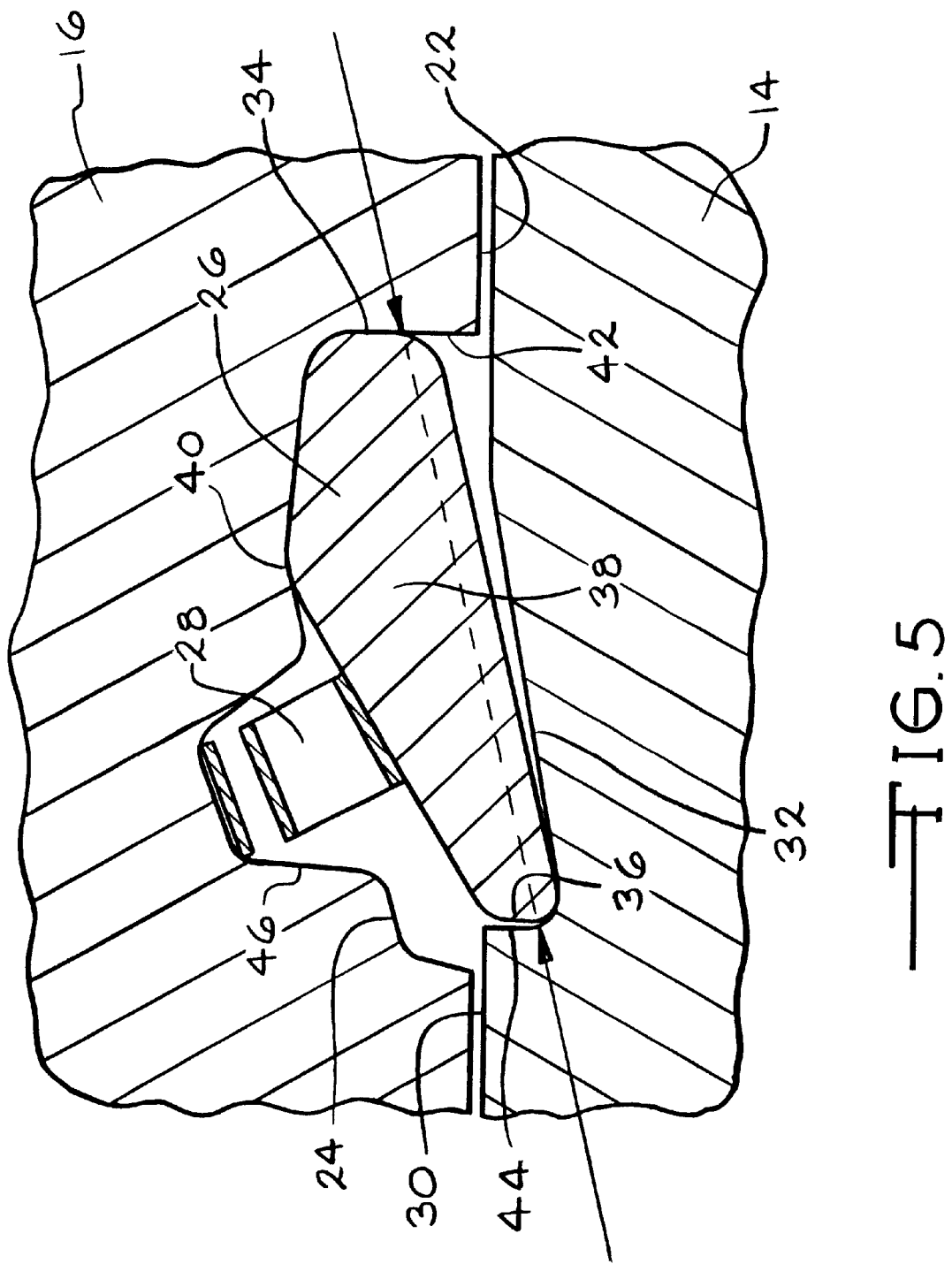
FIG. 5 is a side cutaway detail view of a pocket plate and a notch plate showing the pawl in an engaged position with the notch plate.
Figure 6:
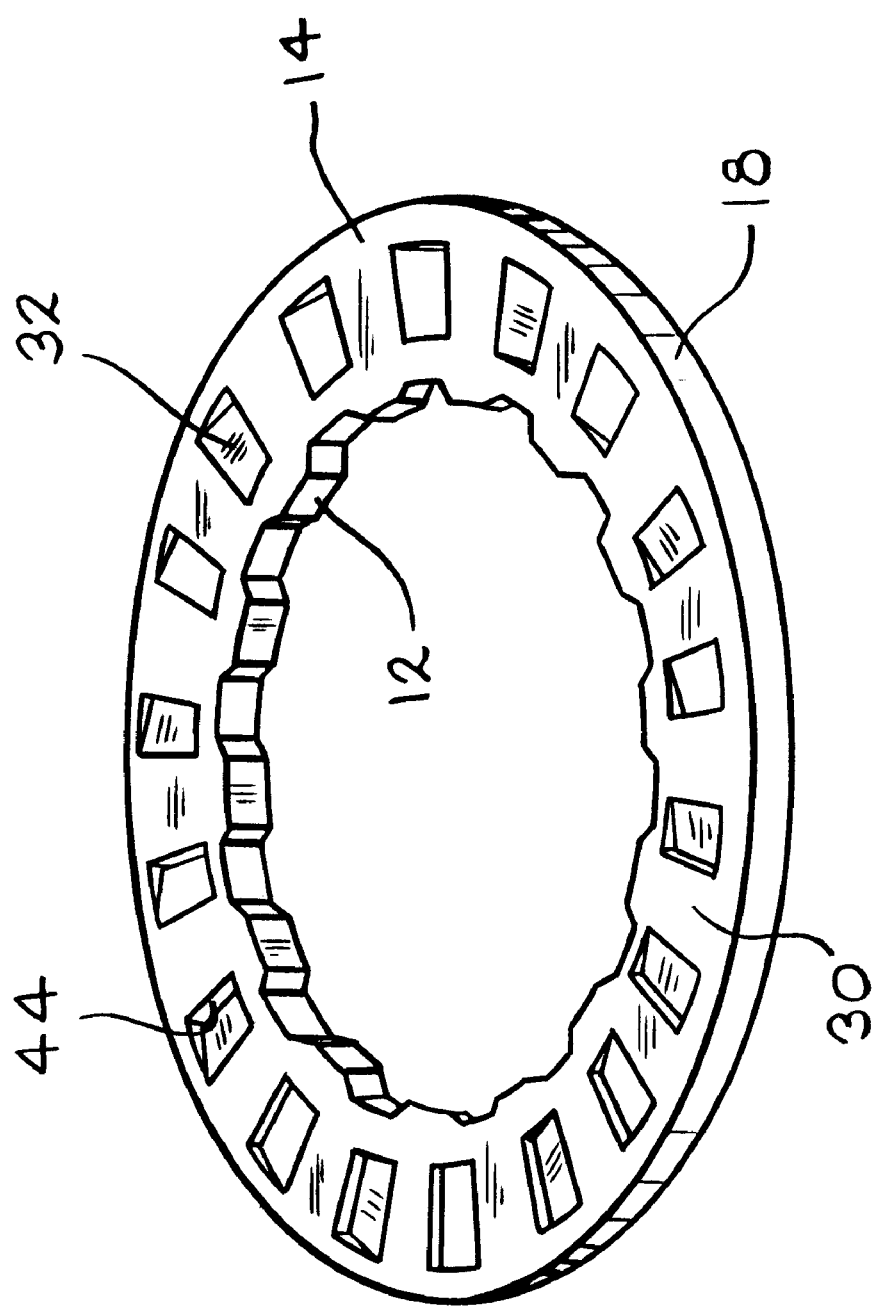
FIG. 6 is a detail view of the notch plate of the present invention.
Figure 7:
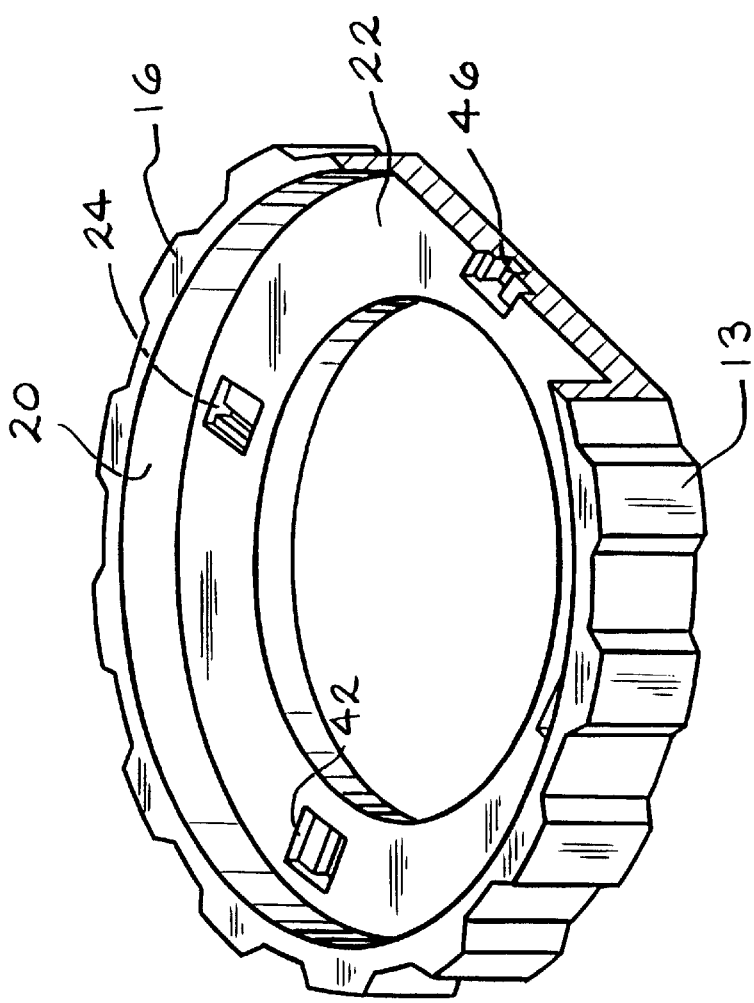
FIG. 7 is a detail view of the pocket plate of the present invention.

The pocket plate 16 has an inner drive face 22 which incorporates a series of uniformly circumferentially spaced pockets 24, as best shown in FIGS. 4, 5 and 7. In the preferred embodiment, the pockets 24 are spaced at 90° intervals to provide for a plurality of four pockets 24 equidistantly spaced within the drive face 22. Each pocket is designed to contain a pawl 26 and spring 28, as best shown in FIGS. 1–5.

The driven face 30 of the notch plate 14 includes a series of uniformly circumferentially spaced notches 32, greater in number than the number of pockets 24, which extend radially and are equally spaced about the driven face 30. Preferably, there are eighteen notches 32 on the driven face 30 of the notch plate 14. Thus, when the pocket plate 16 and notch plate 14 are in their respective engaged positions, two of the pockets 24 containing their respective pawls 26 and two of the notches 32 will comprise the coupling arrangement of the clutch assembly 10.

Since the preferred embodiment of the pocket plate 16 has four pawls 26 and the preferred embodiment of the notch plate 14 has eighteen notches 32, there will always be an engagement of two pawls 26 with notches 32 during the engaged rotation of the pocket plate 16 with the notch plate 14. Of course, the number of pawls 26 and number of notches 32 can be varied depending upon the design required for varying torque loads and static forces so that a differing number of pawls 26 can be engaged with notches 32 at any given time. The number of pawls and notches is selected such that the two numbers have only one common factor, other than one. For instance, if the designer wished for all four pawls 26 to be engaged with notches 32, the designer could design the notch plate 14 to have eight, twelve, sixteen or twenty notches. It has been found that the more notches 32 provided, the less opportunity for backlash in the clutch assembly 10. Therefore, a number of notches 32 close to twenty is preferable. In the preferred embodiment of the present invention, it is intended that two pawls 26 be engaged with the notches at any given time and the preferred number of notches 32 for the notch plate 14 is eighteen and the preferred number of pawls 26 is four. This design permits the clutch assembly to be somewhat lightweight, compact, and yet sustain heavy torque loads and provide for the elimination of the eccentric forces which create deleterious wearing on the clutch assembly.

Figure 2:
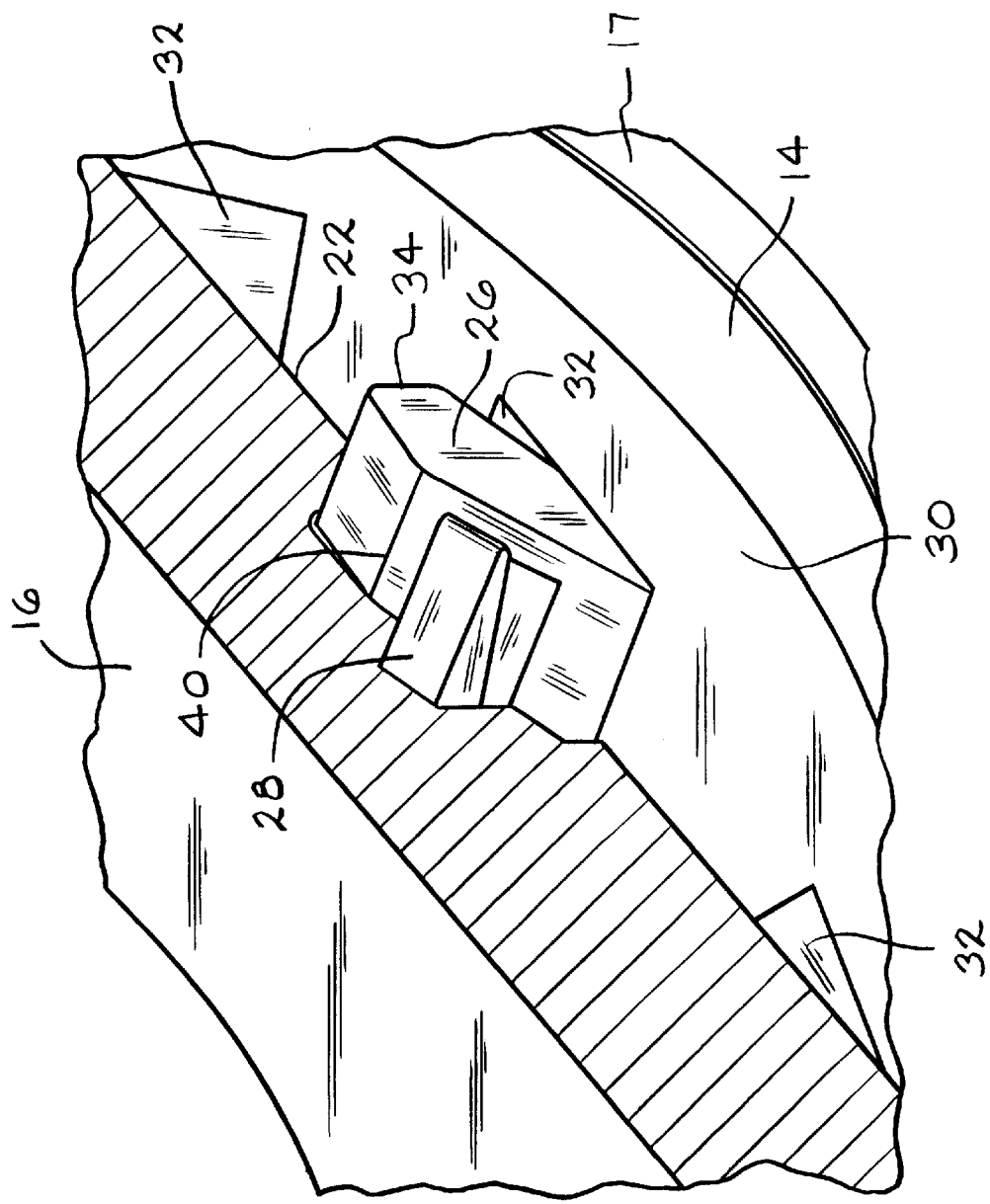
FIG. 2 is a detail view of FIG. 1 showing a close up view of the engagement between the pocket plate and notch plate with the pawl in an engaged position between the pocket plate and the notch plate.

Referring to FIGS. 2 and 5, engagement between the pawls 26 and notches 32 is provided when the pocket plate 16 is rotated clockwise, thus causing the notch plate 14 to also rotate with the pocket plate 16. Adversely, when the pocket plate 16 is rotated counterclockwise, all of the pawls 26 functionally remain in their respective pockets 24 and do note engage the notches 32 as shown in FIGS. 3 and 4. As a result, the pocket plate 16 rotates freely in the counterclockwise direction and the notch plate 14 is not engaged.

Figure 8:
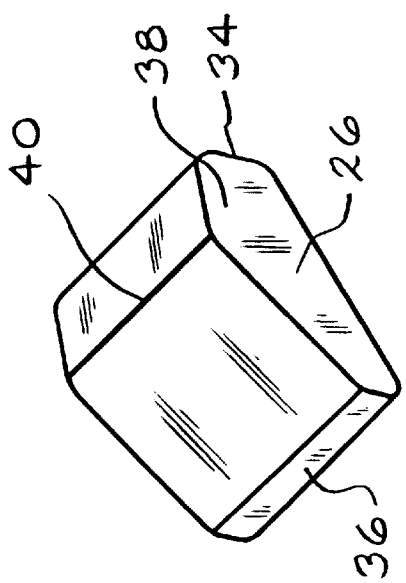
FIG. 8 is a perspective view of a pawl as used in the present invention.
Figure 9:
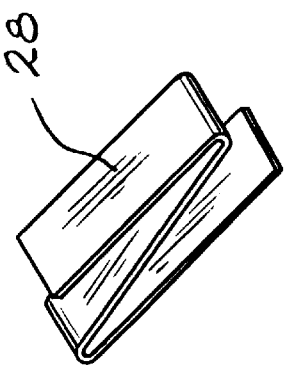
FIG. 9 is a perspective view of a preferred embodiment of a spring as used with the pawl in the present invention.

Referring now to FIGS. 4, 5 and 8, each of the pawls 26 is designed for use in the preferred embodiment of the invention, to have opposed compressive load bearing surfaces 34, 36 which are substantially parallel to each other. The cross-section of the pawl 26 is thicker in the region 38 midway between the two compressive load bearing surfaces 34, 36, which provides a greater resistance to failure as a result of high compressive load bearing forces. The pawl 26 has a peak or ridge 40 at its thickest region 38 which serves as a pivot for rotation of the pawl 26 in the pocket 24, as shown in FIGS. 4 and 5. Each pawl 26 has an axial width greater than the circumferential length and the circumferential length of the pawl 26 is greater than the radial thickness of the pawl 26 at region 38. The pocket 24 is designed to provide a compressive load bearing surface 42 which is angled from the perpendicular to the line of action of the load. The compressive load bearing surface 44 of the notch 32 is angled from the perpendicular to the line of action of the load to provide for positive engagement between each pawl 26 and its respective notch 32, as shown in FIG. 5. Thus, if a situation occurs where the pawl is not completely engaged with its respective notch, the compressive bearing load on the pawl 26 will force it rapidly into full engagement with the notch 32. The load bearing surfaces 34, 36 of the pawl 26 are designed to engage the load bearing surfaces 42, 44 respectively and provide for a compressive load bearing line of action as shown in FIG. 5 which extends angularly the length of the pawl 26 between load bearing surface 42 of the pocket 24 and load bearing surface 44 of the notch 32. Further, the pocket 24 is shaped to provide an indentation 46 which retains the spring member 48, preferably a Z-shaped spring as shown in FIG. 9. However, springs and resilient members of any variety may be used in accordance with design specifications.

Preferably, the pawl 26 is of a generally cylindrical cross-sectional shape as shown in FIG. 8, having flat ends and the same cross-sectional cylindrical shape throughout its axial width. Thus, the pawl 26 can be easily manufactured by either an extrusion or, preferably a drawing process. The thicker cross-section of the pawl 26 further allows for manufacture of the pawl from a lower grade less expensive material. The pawls are preferably constructed from 52100 bearing steel and the notch plate 14 and pocket plate 16 are constructed from a low alloy bearing stock, powdered metal (steel) or aluminum.

Figure 10:
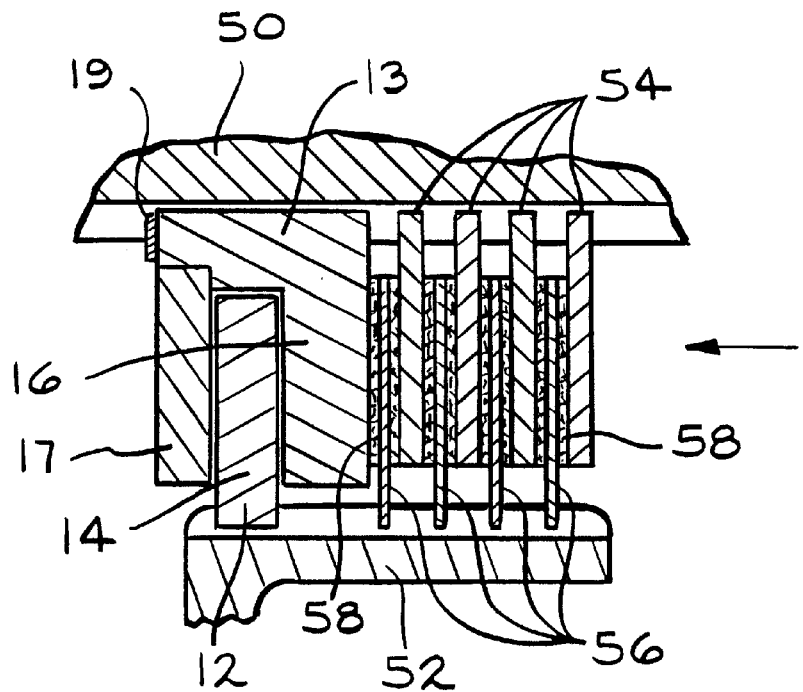
FIG. 10 is a schematic cutaway view of a friction clutch having the pocket plate in use as a backing plate.

Referring now to FIG. 10, an alternative embodiment of a friction clutch incorporating the present invention are shown. The friction clutch includes a drum or casing 50 which encloses the friction clutch components and a hub 52 which is engaged by splines 12 to the driven plate or notch plate 14. The drum or casing 50 is engaged with the drive plate or pocket plate 16 by splines 13 which are located on the outer radial surface of the pocket plate 16. The notch plate 14 is held in proper radial orientation by its interface with the pocket plate 16 as described earlier herein and is held in proper axial orientation by retaining plate 17. The retaining plate 17 serves to counter any axial thrust that occurs when the clutch is engaged. Snap ring 19 seals the pocket plate 16 in a fixed axial position. The friction clutch is composed of series of interleaved friction plates 56 engaged with the hub 52 and separation plates 54 engaged with the drum 50. The friction plates 56 carry friction material 58 for engagement with the separation plates 54. The friction clutch can be engaged by applying a force as indicated by the arrow in FIG. 10. The force is reacted by the drive plate or pocket plate 16. Use of the drive plate 16 in this manner eliminates the need for an additional backing plate in the clutch, thereby allowing the clutch to more easily meet the objectives of compactness and being lightweight.

Figure 11:
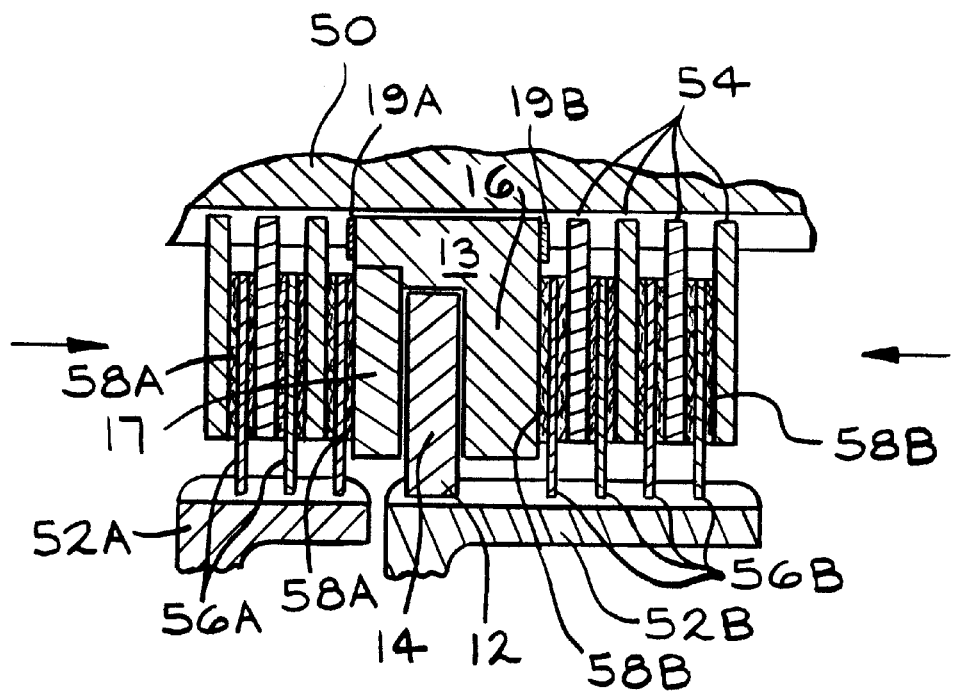
FIG. 11 is a schematic cutaway view of a friction clutch having the pocket plate and the retaining plate each in use as a backing plate.

Another alternative embodiment of a friction clutch incorporating the present invention is shown in FIG. 11, which provides for two friction clutches which are independently engageable by the forces indicated by the opposed arrows. The friction clutch includes a drum or casing 50 that encloses the friction clutch components and two independently rotating hubs 52A, 52B, one of which, 52B engaged by splines 12 to driven plate or notch plate 14. The drum or casing 50 is engaged with the drive plate or pocket plate 16 by splines 13 which are located on the outer radial surface of the pocket plates 16. The notch plate 14 is held in proper radial orientation by its interface with the pocket plate 16 as described earlier herein and is held in proper axial orientation by retaining plate 17. The retaining plate 17 serves to counter any axial thrust that occurs when the clutch is engaged. Snap rings 19A, 19B locate the pocket plate 16 and notch plate 14 in a fixed axial position. The two independent friction clutches are each composed of a series of interleaved friction plates 56A, 56B engaged respectively with the hubs 52A, 52B and separation plates 54 engaged with the drum 50. The friction plates 56A, 56B carry friction material 58A, 58B for engagement with the separation plates 54. The friction clutches can be independently engaged by application of the forces shown by arrows in FIG. 11. The force of the first friction clutch (B) is reacted by the drive plate or pocket plate 16. The force of the second clutch (A) is reacted by the retaining plate 17. Use of the drive plate 16 and retaining plate 17 in this manner eliminates the need for additional backing plates in the clutch, thereby allowing the clutch to more easily meet the objection of being compact and relatively lightweight.

In operation, as shown in FIGS. 4 and 5, when the pawl 26 is not in alignment with the notch 32, the spring 48 is compressed and the pawl is retained within the pocket 24 so that the pocket plate 16 and notch plate 14 rotate counter to each other without engagement. In FIG. 5, the pawl 26 has aligned with the notch 32 and the spring 28 has pressed the pawl 26 about its pivot 40, such that the load bearing surfaces 34, 36 of the pawl 26 engage the load bearing surface 42, 44 of the pocket plate and notch plate 14 respectively, thereby providing for engagement between the two plates and successful torque carrying capacity.

The above description of the preferred embodiment of the present invention is intended to be illustrious in nature and not intended to be limiting upon the scope of the following claims.

I claim:

1. A one way planar clutch assembly defining a longitudinal axis comprising in combination:

a planar drive member having a drive face positioned for rotation normal to the axis;

a driven member positioned normal to the axis for rotation about the axis, the driven member including a planar driven face which is positioned in close proximity with and parallel to the drive face;

a retainer member having opposed generally planar faces positioned normal to the axis for maintaining the drive member and the driven member in axial alignment;

a coupling structure composed of a first series of pockets spaced uniformly circumferentially about the planar drive face and a plurality of notches spaced uniformly circumferentially around the planar driven face, the plurality of notches being greater in number than the plurality of pockets, each of the pockets retaining a pawl and resilient member for pressing the pawl outwardly from the planar drive face to engage one of the notches on the planar driven face, such that at least two of the plurality of pawls are engaged respectively with the two of notches at any point of engagement between the drive face and the driven face; and each of the pawls have opposed compressive load bearing surfaces which engage a shoulder on a driven notch and a shoulder on a drive pocket when engaged between the drive plate and the driven plate, such that the drive plate rotates the driven plate in the same direction about the axis when the drive member is rotated in a specified first direction, and wherein the drive member rotates freely about the axis in a specified opposed direction without rotating the driven member as the pawls do not engage the notches in the driven member during rotation in such opposed direction and each of said pawls having a cross-section thicker in the region midway between the two compressive opposed load bearing surfaces.

2. The clutch assembly of claim 1 wherein each of the pawls includes a ridge at its thickest cross-section, the ridge defining a pivot point about which the pawl rotates between such positions of engagement and disengagement.

3. The clutch assembly of claim 2, wherein each of the pockets includes a recess for retaining the resilient member and the ridge of said pawl.

4. The one way clutch of claim 1, wherein each pawl has an axial width greater than the circumferential length and the circumferential length of the pawl is greater than the radial thickness of the pawl at the thickest portion.

5. The one way clutch assembly of claim 1, wherein the pockets extend radially across the extent of the drive face.

6. The one way clutch assembly of claim 1, wherein the notches extend radially across the extent of the driven face.

7. The one way clutch assembly of claim 1, wherein the compressive load bearing surfaces are non-parallel.

8. The one way clutch assembly of claim 1, wherein the compressive load bearing surface of the pawl adjacent its respective pocket is perpendicular to the line of action of the compressive load and the opposed load having surface adjacent to its respective notch is not perpendicular to the line of action of the compressive load.

9. The one way clutch of claim 1 wherein the pockets are located on the driven face and the notches are located on the drive face.

10. The one way clutch of claim 1 wherein the drive member includes a flange positioned radially about the outside radial edge of the driven member, wherein the flange supports the driven member as a radial bearing.

11. The one way clutch of claim 1 wherein the driven member includes a plurality of splines spaced evenly about its outer diameter.

12. The one way clutch of claim 1 wherein the driven member includes a plurality of splines spaced about its inner diameter.

13. The one way clutch of claim 1 wherein each of the pawls is of a generally cylindrical cross-section and includes flat ends.

14. The one way clutch of claim 1 wherein each of the pawls has a load bearing surface in contact with the drive member which is of a longer surface area than the opposed load bearing surface in contact with the driven member.

15. The one way clutch of claim 1 wherein the planar back face of the drive member which is opposed to the drive face is used as a friction clutch backing plate.

16. The one way clutch of claim 1 wherein one of the planar faces of the retainer plate is used as a friction clutch backing plate.

17. The one way clutch of claim 1 wherein the planar back face of the drive member which is opposed to the drive face is used as a friction clutch backing plate and one of the planar faces of the retainer plate is used as a friction clutch backing plate.

* * * * *